(12) United States Patent
Patel et al.

(10) Patent No.: US 8,726,348 B2
(45) Date of Patent: May 13, 2014

(54) COLLABORATIVE RULES BASED SECURITY

(75) Inventors: Depti Patel, Agoura Hills, CA (US); Robert John Rencher, Normandy Park, WA (US); James M. Rubert, Puyallup, WA (US); David Wayne Nelson, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 330 days.

(21) Appl. No.: 12/969,323

(22) Filed: Dec. 15, 2010

(65) Prior Publication Data

US 2012/0159572 A1    Jun. 21, 2012

(51) Int. Cl.
*G06F 7/04* (2006.01)

(52) U.S. Cl.
USPC .......................................................... 726/3

(58) Field of Classification Search
USPC .................................................. 726/3–4, 21
See application file for complete search history.

(56) References Cited

U.S. PATENT DOCUMENTS

| | | | |
|---|---|---|---|
| 2009/0187970 A1* | 7/2009 | Mower et al. ...................... | 726/3 |
| 2010/0162359 A1* | 6/2010 | Casey et al. ........................ | 726/3 |
| 2011/0296370 A1* | 12/2011 | Ferris et al. .................... | 717/100 |
| 2012/0023554 A1* | 1/2012 | Murgia et al. ..................... | 726/4 |
| 2012/0054280 A1* | 3/2012 | Shah ............................. | 709/205 |

FOREIGN PATENT DOCUMENTS

EP    1942629 A1    7/2008

OTHER PUBLICATIONS

EP search report dated Mar. 15, 2012 regarding application EP11193889, applicant The Boeing Company, 5 Pages.
Pearson, "Taking Account of Privacy when Designing Cloud Computing Services", CLOUD'09, May 23, 2009, Vancouver, Canada, 2009 IEEE, pp. 44-52.
Lin et al., "A Fast Parallel Algorithm for Discovering Frequent Patterns", 2009, GRC '09. IEEE International Conference on Granular Computing, Nanchang, Aug. 17-19, 2009 pp. 398-403.
"Microsoft's Cloud Computing Patent Application", Dec. 10, 2009, Silverlight Developers' Journal, 1 page http://silverlight.sys-con.com/node/1204365.

* cited by examiner

*Primary Examiner* — Brandon Hoffman
*Assistant Examiner* — Anthony Brown
(74) *Attorney, Agent, or Firm* — Yee & Associates, P.C.

(57) ABSTRACT

A cloud computing security system. An access manager module includes first and second client profiles. The first client profile has a first set of rules enabling access to a first set of cloud computing system resources, and the second client profile has a second set of rules enabling access to a second set of cloud computing system resources. A security logic module is in communication with the access manager module. The security logic module is configured to receive an access request for access to one of the first and second sets of cloud computing system resources. Responsive to determining that the access request complies with at least one of the first set of rules and the second set of rules, the security logic module is configured to provide an access grant that grants access to at least one of the first and second sets of cloud computing system resources.

18 Claims, 6 Drawing Sheets

COLLABORATIVE RULES BASED SECURITY

BACKGROUND INFORMATION

1. Field

The present disclosure relates generally to data processing systems and, in particular, to a method, computer program product, and apparatus for collaborative rules based security. Still more particularly, the present disclosure relates to a method, computer program product, and apparatus for collaborative rules-based security associated with cloud computing systems.

2. Background

Cloud computing refers to providing computing resources, software, and information to clients on demand over the Internet, in a manner similar to an electricity grid. Cloud computing system services may include, without limitation, data as a service (DAAS), software as a service (SAAS), platform as a service (PAAS), infrastructure as a service (IAAS), and network as a service (NAAS).

Cloud computing services enable clients to purchase access to computing services that are supported on computer hardware and software owned and maintained by a cloud computing system provider. The cloud computing service users are able to purchase only those cloud computing services they require without having the burden of purchasing and maintaining the hardware, software, and information technologies necessary to support those services.

Cloud computing enables users to obtain easy access to cloud computing services over the Internet from remote computing sites. Users typically access cloud computing services through a web browser which enables the user to access cloud computing system software and applications as if the software, applications, and other data were installed locally on the users own computer.

As cloud computing systems become more readily available and demand for cloud computing system services increases, the need for faster, more efficient, reliable, and secure access to those services becomes increasingly important. Therefore, it would be advantageous to have a method and apparatus that takes into account one or more of the issues discussed above, as well as possibly other issues.

SUMMARY

An advantageous embodiment of the present disclosure provides a cloud computing security system. An access manager module includes first and second client profiles. The first client profile has a first set of rules enabling access to a first set of cloud computing system resources, and the second client profile has a second set of rules enabling access to a second set of cloud computing system resources. A security logic module is in communication with the access manager module. The security logic module is configured to receive an access request for access to one of the first and second sets of cloud computing system resources. Responsive to determining that the access request complies with at least one of the first set of rules and the second set of rules, the security logic module is configured to provide an access grant that grants access to at least one of the first and second sets of cloud computing system resources.

The advantageous embodiments also provide for a method for implementing cloud computing system security, the method implemented by a processor. An access request to at least one cloud computing system resource is evaluated against a set of rules associated with a requestor to determine compliance of the access request to the set of rules. Access is granted to the at least one cloud computing system resource to the requestor in response to a determination of compliance.

The advantageous embodiments also provide for a cloud computing apparatus. The cloud computing apparatus includes a security logic module. The cloud computing apparatus includes an access manager module in communication with the security logic module, wherein the access manager module is configured to receive an access request from a client device for access to at least one cloud computing system resource. The cloud computing apparatus includes a request validator module operatively coupled to the access manager module and configured to determine whether the access request is a valid request and whether a requestor associated with the client device is a valid candidate for utilization of the security logic module. The access manager module includes a plurality of client profiles, each profile in the plurality of client profiles having a set of rules defining granular access to the at least one cloud computing system resource by the client device. An access grant is provided upon determination of request compliance with the set of rules. The cloud computing apparatus includes an association definition module configured to establish a model network resource association compliant with the access grant.

The features, functions, and advantages can be achieved independently in various embodiments of the present disclosure or may be combined in yet other advantageous embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

The advantageous embodiments recognize that providers of cloud computing system services require secure means to deliver access to clients that are reliable and efficient. The advantageous embodiments recognize that there is a growing need for greater security and control over client access to cloud computing system resources.

Figure 1:
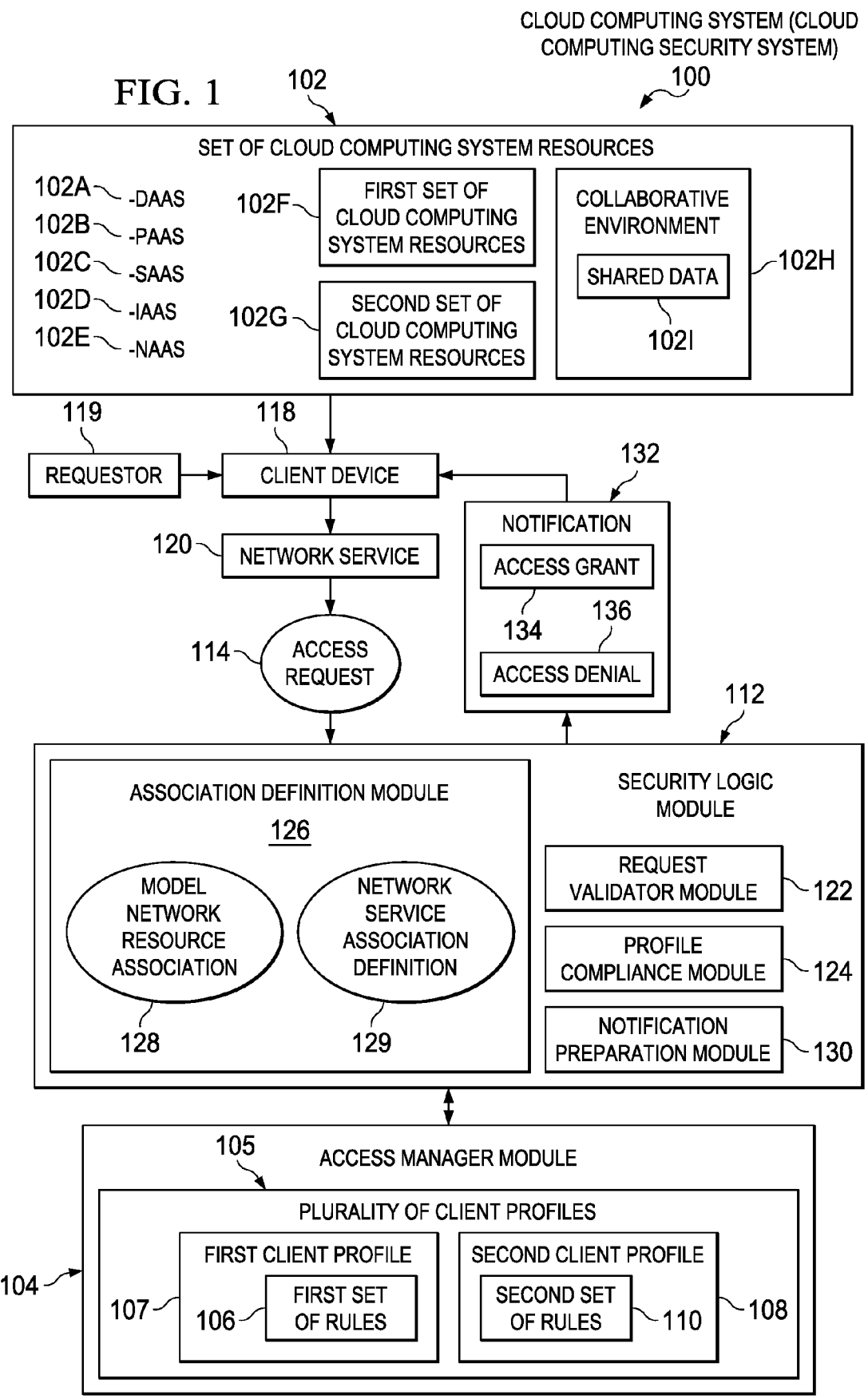
FIG. 1 is a block diagram of a cloud computing system in which an advantageous embodiment may be implemented.

Referring now to FIG. 1, a cloud computing system is shown in accordance with an advantageous embodiment.

Cloud computing system 100 is a system for providing cloud computing system services to clients over the Internet. Cloud computing system 100 may be considered a cloud computing security system.

Cloud computing system 100 may be implemented as a system having computing resources available for utilization by clients. Examples of such resources include but are not limited to set of cloud computing system resources 102. Cloud computing system 100 may also be implemented using a number of modules, as described further below. As used herein the term "module" refers to any of computer hardware, software, or a combination thereof that is configured to perform a corresponding function, such as those indicated below. Modules may be part of, or connected to, other modules in a manner calculated to achieve the functions of cloud computing system 100, as described below.

Set of cloud computing system resources 102 is a set of one or more cloud computing system resources. A cloud computing system resource within set of cloud computing system resources 102 may include, without limitation, data as a service (DAAS) 102A, platform as a service (PAAS) 102B, software as a service (SAAS) 102C, infrastructure as a service (IAAS) 102D, network as a service (NAAS) 102E, or any other service that may be provided by a cloud computing system. Set of cloud computing system resources 102 may be considered to be multiple sets of cloud computing system resources that are distinct from each other. Thus, for example, set of cloud computing system resources 102 may include a first set of cloud computing system resources 102F and a second set of cloud computing system resources 102G. First and second sets of cloud computing system resources 102F and 102G may include any of the services described above, or other resources. First and second sets of cloud computing system resources 102F and 102G may be the same sets of resources, or may be different sets of resources. First and second sets of cloud computing system resources 102F and 102G may be logical arrangements of resources for purposes of association with client profiles, such as first client profile 107 and second client profile 108.

Access manager module 104, in this example, is a cloud computing system component for managing client requests for access to at least one cloud computing system resource in set of cloud computing system resources 102. Access manager module 104 may include, without limitation, plurality of client profiles 105. Plurality of client profiles 105 is shown as having first client profile 107 and second client profile 108. However, plurality of client profiles 105 may include more client profiles, or in an alternative advantageous embodiment may include only one client profile.

Each client profile in plurality of client profiles 105 includes a set of rules. As used herein, the term "set" refers to one or more items, unless defined otherwise herein. For example, first client profile 107 includes first set of rules 106, and second client profile 108 includes second set of rules 110. Each of first set of rules 106 and second set of rules 110 may include a single rule, or two or more rules. Each of first and second sets of rules enable access to one or more resources in set of cloud computing system resources 102. Thus, for example, first set of rules 106 may enable access to first set of cloud computing system resources 102F and second set of rules 110 may enable access to second set of cloud computing system resources 102G. These two sets of cloud computing system resources may be the same or may be different. In an advantageous embodiment, access manager module 104 may maintain a profile, such as first client profile 107, associated with requestor 119. A corresponding set of rules, such as set of rules 106, may define granular access to at least one cloud computing system resource in set of cloud computing system resources 102.

In an embodiment, access to set of cloud computing system resources 102 may constitute granular access. Granular access refers to discrete access to resources in which access to a particular cloud computing resource is isolated to specific requestors and particular network service providers. Granular access enables isolation of access by a requestor to physical and logical cloud computing system resources, access to parts of a particular cloud computing resource, as well as discrete limitations on access to data available on cloud computing system 100.

For example, but without limitation, security logic module 112 permits a user access to a resource, such as an email server. The granular access defined by rules in plurality of client profiles 105 may limit that user access to a particular email account on that email server, or even limit the user to sending emails to a select group of recipients. Likewise, granular access may be used to control data access and/or limit sharing of data between users accessing collaborative resources on cloud computing system 100. Thus, for example, granular access may be used to limit sharing of data between users who are using the same network as a service resources or data as a service resources.

Security logic module 112 applies a set of rules, such as first or second sets of rules 106 or 110, to enable granular access for various users requesting access to one or more cloud computing system resources. These various users may be one or more users, including human users, requests from hardware components, requests from software components, or combinations thereof, any of whom may be considered to be requestor 119. Security logic module 112 may be a "security as a service" (SECaaS) collaborative, rules-based security logic component.

Security logic module 112 applies rules-based guidelines to resources within cloud computing system 100 for granularity of access provided to clients. Security logic module 112 applies rules, such as first set of rules 106, to determine which hardware and/or software cloud computing system resources may be made available to a particular client, as well as cloud computing system platform hardware and software resource availability.

In an embodiment, security logic module 112 may be characterized as being in communication with access manager module 104. Security logic module 112 may be configured to receive an access request 114 for access to one of the first and second sets of cloud computing system resources 102F or 102G. Security logic module 112 may be further configured to determine whether the access request 114 complies with at least one of the first set of rules 106 and the second set of rules 110. If access request 114 complies with at least one of the first and second sets of rules, then security logic module 112 is configured to provide an access grant 134 that grants access to at least one of the first and second sets of cloud computing system resources 102F or 102G. Access grant 134 may take the form of notification 132, or may be a part of notification 132. Access grant 134 might instead take the form of an acceptance of a challenge issued by one or more of set of cloud computing system resources 102. The advantageous embodiments described herein contemplate that access grant 134 may be associated with either notification 132 or the acceptance of a challenge. Thus, the term "access grant" should not be considered limited by how access is actually achieved.

Security logic module 112 isolates client access to hardware and software based cloud computing services based on security logic. Security logic module 112 receives access request 114 for access to set of cloud computing system resources 102 from a client device 118 associated with requestor 119.

Client device 118 may be implemented as any type of data processing system, such as, without limitation, data processing system 500 shown in FIG. 5 below. Client device 118 is a computing device associated with requestor 119 requesting access to at least one cloud computing system resource in set of cloud computing system resources 102.

Requestor 119 requests access to physical and/or logical resources available on cloud computing system 100, such as set of cloud computing system resources 102. Requestor 119 may be a user external to cloud computing system 100. Requestor 119 may be an entity, such as, without limitation, an individual, an organization, or any other type of entity.

In this example, client device 118 is a remote cloud computing service client associated with first client profile 107. Client device 118 is requesting access to set of cloud computing system resources 102 provided by cloud computing system 100.

Set of cloud computing system resources 102 may include resources that are hardware resources, software resources, or resources that are a combination of both hardware and software resources available on cloud computing system 100.

Access request 114 is sent to cloud computing system 100 via network service 120 associated with client device 118. Request validator module 122 determines whether access request 114 is a valid request. In an advantageous embodiment, request validator module 122 may be configured to compare access request 114 with at least one of the first and second sets of rules 106 and 110 to determine compliance of access request 114 with those rules. In an advantageous embodiment, request validator module 122 is further configured to interrogate access request 114 and determine whether requestor 119 associated with access request 114 is a valid candidate for utilization of security logic module 112. Likewise, request validator module 122 may be further configured to interrogate access request 114 to determine whether a network service associated with the access request 114 is a valid candidate for utilization of the security logic module 112.

Request validator module 122 may interrogate access request 114 to determine whether client device 118 is a valid candidate for access to set of cloud computing system resources 102. Request validator module 122 may also interrogate access request 114 to determine if network service 120 associated with client device 118 is a valid candidate for access to set of cloud computing system resources 102.

Profile compliance module 124 evaluates access request 114 against first set of rules 106 associated with first client profile 107 to determine whether access request 114 is in compliance with first set of rules 106. In an example, first set of rules 106 may specify that client device 118 may utilize third tier and second tier billing software services, but client device 118 may not utilize the top tier billing software.

Security logic module 112 denies access to client device 118 if access request 114 is non-compliant with first set of rules 106. In other words, if any rule in first set of rules 106 does not permit client device 118 to access and/or utilize set of cloud computing system resources 102, security logic module 112 does not authorize access request 114.

In response to a determination that access request 114 is in compliance with first set of rules 106, association definition module 126 establishes model network resource association 128 to be compliant with the access grant 134. Model network resource association 128 is an association of set of cloud computing system resources 102 to client device 118. Association definition module 126 modifies first client profile 107 of client device 118 to accommodate model network resource association 128. Association definition module 126 may create or maintain a network service association definition 129. Thus, in an advantageous embodiment, responsive to evaluating the access request 114 and a determination of compliance with a set of rules such as first set of rules 106, association definition module 126 may establish a model network resource association 128 to form a network services association definition 129. Likewise, responsive to evaluating the access request 114, the access manager module 104 may modify a profile associated with requestor 119, such as first client profile 107, within plurality of client profiles 105 to include a network service association definition 129. This function might also be performed by association definition module 126.

In an advantageous embodiment, at least one cloud computing system resource may be a network as a service, such as network as a service 102E. In this case, security logic module 112 may enable granular access to shared data 102I in collaborative environment 102H accessed through network as a service 102E.

Notification preparation module 130 generates notification 132 to client device 118. Notification 132 may transmit either access grant 134, indicating an acceptance of access request 114, or access denial 136, indicating a denial of access request 114.

Some, part, or all of the components shown in FIG. 1 may be considered computer processing means or data processing means. FIG. 1 is intended as an example, and not as an architectural limitation for the different advantageous embodiments.

Figure 2:
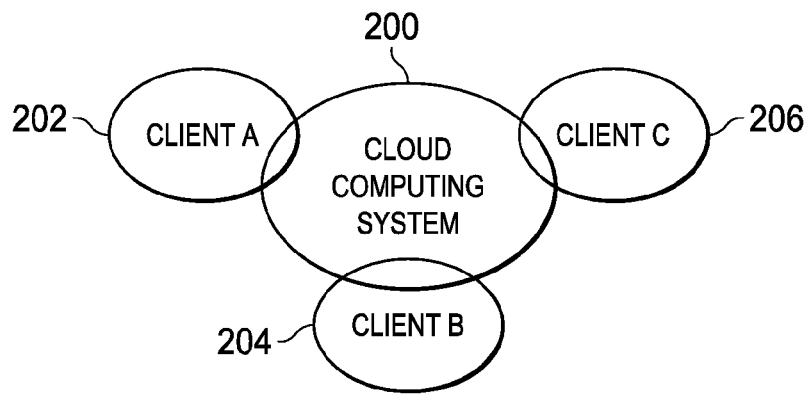
FIG. 2 is a diagram illustrating a cloud computing system with a set of cloud service clients in accordance with an advantageous embodiment.

FIG. 2 is a cloud computing system with a set of cloud service clients in accordance with an advantageous embodiment. Cloud computing system 200 is a cloud computing system, such as cloud computing system 100 in FIG. 1. FIG. 2 is intended as an example, and not as an architectural limitation for the different advantageous embodiments.

Cloud computing system 200 may include, without limitation, hardware, software, and/or wetware. The hardware associated with cloud computing system 200 may include any type of hardware, such as, without limitation, a servers, a routers, a hard drives, a processors, a secondary data storage device, as well as any other type of computer hardware.

Cloud computing system 200 may utilize one or more network architectures, such as, without limitation, the Internet, Extranet, Ethernet, Intranet, local area network (LAN), virtual private network (VPN), perimeter network, and/or any other type of network.

Cloud computing system 200 may provide any type of cloud services, such as, without limitation, data as a service, software as a service, platform as a service, infrastructure as a service, network as a service, or any other service that may be provided by a cloud computing system.

In this example, cloud computing system 200 provides services to client A 202, client B 204, and client C 206 over an Internet connection. Cloud computing system 200 in this example is only providing services to three clients. However, cloud computing system 200 may provide services to any number of clients over the Internet.

Figure 3:
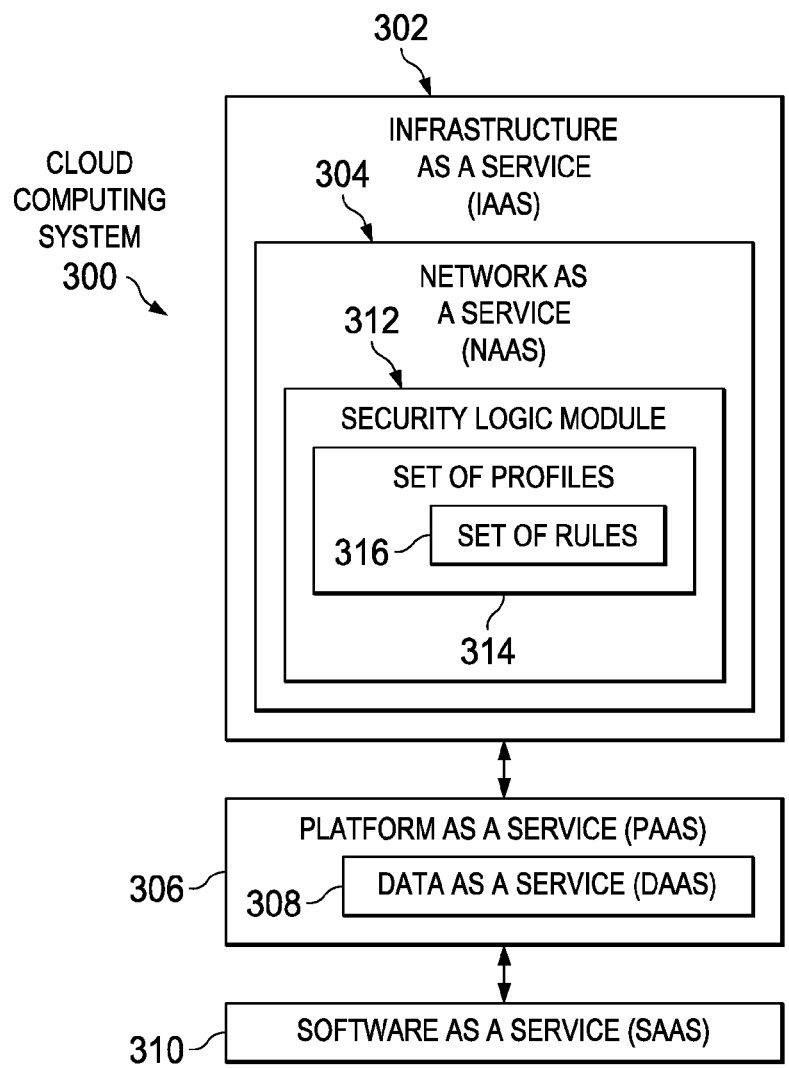
FIG. 3 is a block diagram illustrating a cloud computing system in accordance with an advantageous embodiment.

FIG. 3 is a block diagram illustrating a cloud computing system in accordance with an advantageous embodiment. Cloud computing system 300 may be implemented as any type of networked data processing system for providing services to clients over the Internet, such as, without limitation, cloud computing system 100 in FIG. 1 and cloud computing system 200 in FIG. 2.

Infrastructure as a service 302 may provide computer infrastructure as a platform virtualization environment to clients as a service. Infrastructure as a service 302 may provide clients with access to services, software, and data maintained and supported on cloud computing system 300.

An example of infrastructure as a service 302 may be network as a service 304. Network as a service 304 may provide access to network resources to remote clients on demand. In this manner, cloud computing system 300 may provide network resources and network management services to clients.

Platform as a service 306 may deliver computer platform services to clients. A platform refers to the hardware architecture and software framework that allows software to run. Platform as a service 306 provides a virtualized platform for running software to clients over the Internet or other network connection.

Data as a service 308 provides data on demand to remote clients. Data as a service 308 reduces client costs associated with data storage devices, data organization, and data backup.

Software as a service 310 delivers access to software over the Internet or other network to remote clients. The remote client accesses and utilizes the software without installing or running the software on the local computer utilized by the remote client.

Returning to infrastructure as a service 302, an example of network as a service 304 may be security logic module 312. Security logic module 312 is a rules based logic module for controlling and managing access to cloud computing system 300 services, such as, without limitation, security logic module 112 in FIG. 1. Security logic module 312 controls access to services by a requesting client based on contractual obligations, which may take the form of set of profiles 314 containing set of rules 316.

Set of profiles 314 is a set of one or more client profiles, such as, without limitation, plurality of client profiles 105 in FIG. 1. In this example, set of profiles 314 is implemented within security logic module 312. However, set of profiles 314 may be stored in a database or other data storage device implemented separately from security logic module 312 that is accessible to security logic module 312.

Set of profiles 314 includes set of rules 316 which delineate discrete and granular access applied to clients requesting access to cloud computing system services based on business logic, contractual agreements, relationships, as well as any other criteria. Clients may access the services associated with the physical devices and/or logical devices associated with cloud computing system 300 through network as a service 304 by requesting access through security logic module 312. Accessing the physical devices and/or logical devices contained in network as a service 304 through security logic module 312 grants secure access to cloud computing system resources and data. Likewise, security logic module 312 may be implemented to enable granular access to shared data in a collaborative environment in a set of cloud computing system resources accessed through the network as a service.

Some, part, or all of the components shown in FIG. 3 may be considered computer processing means or data processing means. FIG. 3 is intended as an example, and not as an architectural limitation for the different advantageous embodiments.

Figure 4:
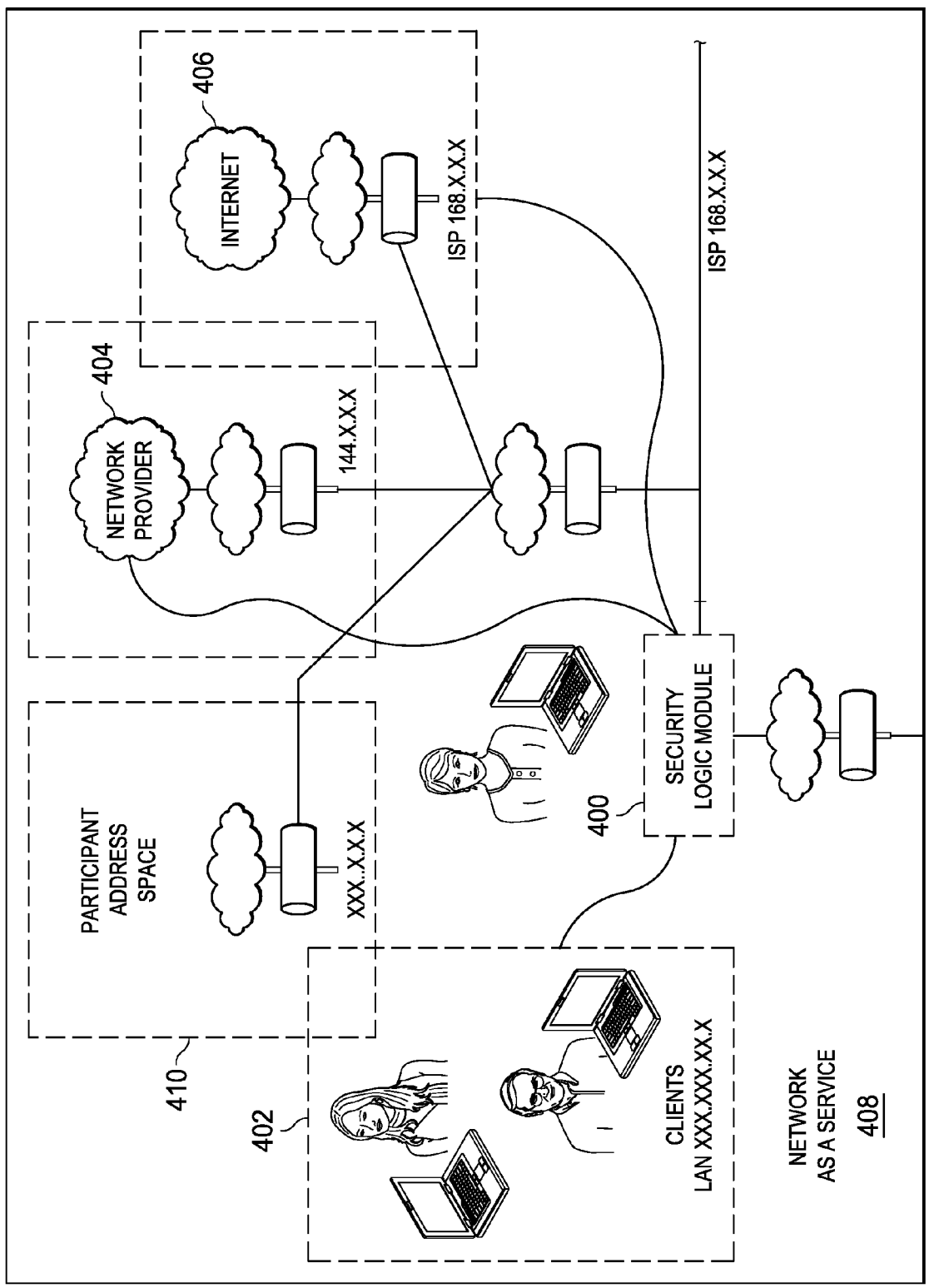
FIG. 4 is a block diagram illustrating a security logic module in accordance with an advantageous embodiment.

FIG. 4 is a block diagram illustrating a security logic module in accordance with an advantageous embodiment. Security logic module 400 may be implemented as a rule-based security logic component, such as security logic module 112 in FIG. 1 and security logic module 312 in FIG. 3.

Security logic module 400 receives a request for access to cloud computing services from clients 402 associated with network provider 404 over Internet 406. Security logic module 400 allows clients 402 to access services associated with a cloud computing system based on rules associated with clients 402. Security logic module 400 controls clients 402 access to physical devices and/or logical devices contained in network as a service 408. One or more of clients 402 may be assigned participant address space 410 within network as a service 408.

Some, part, or all of the components shown in FIG. 4 may be considered computer processing means or data processing means. FIG. 4 is intended as an example, and not as an architectural limitation for the different advantageous embodiments.

Figure 5:
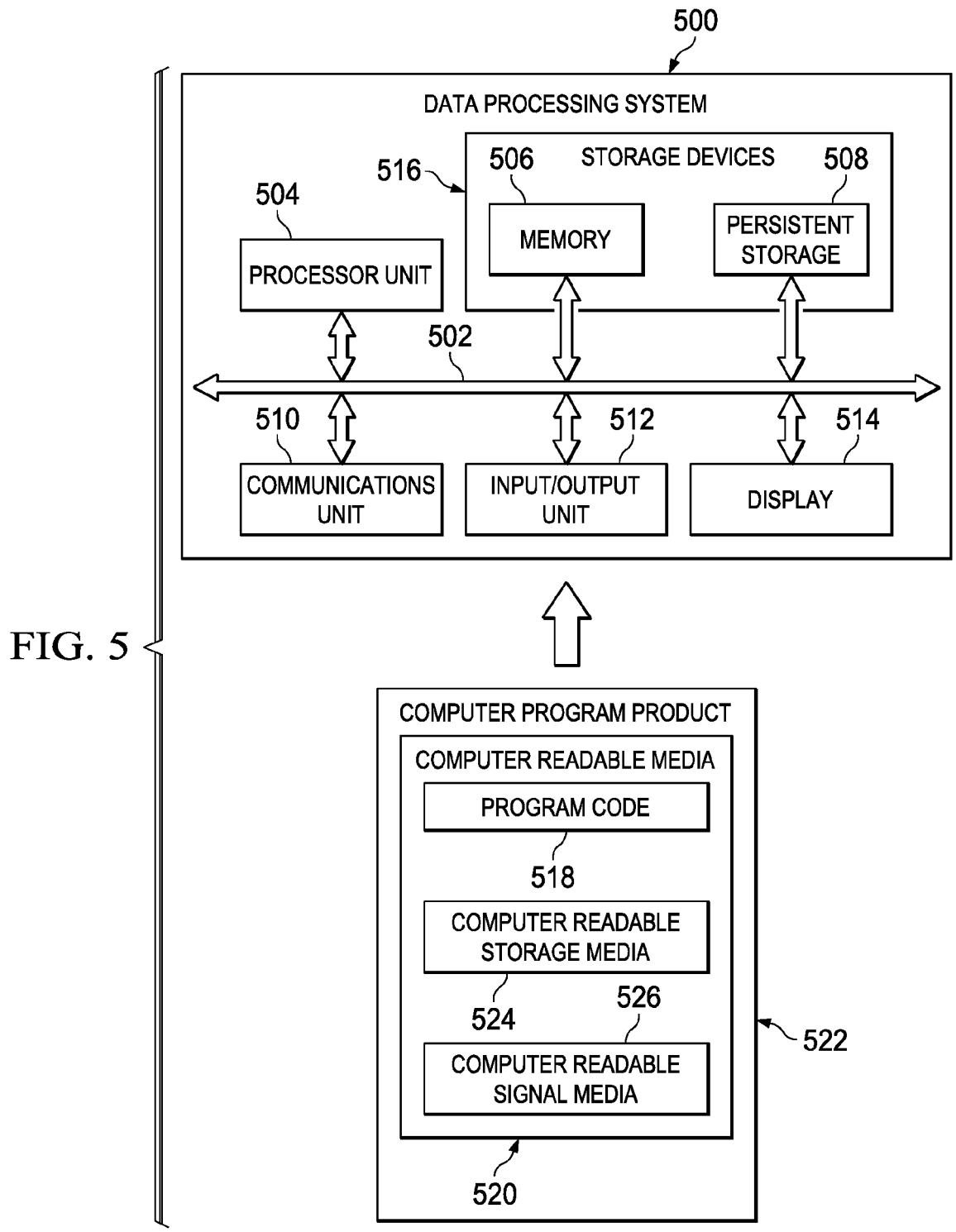
FIG. 5 is an illustration of a data processing system in accordance with an advantageous embodiment.

Turning now to FIG. 5, an illustration of a data processing system is depicted in accordance with an advantageous embodiment. Data processing system 500 may be a data processing system within a cloud computing system, such as cloud computing system 100 in FIG. 1, cloud computing system 200 in FIG. 2, and cloud computing system 300 in FIG. 3. Data processing system 500 may also be implemented as a client computer, such as client 202-206 in FIG. 2 or a client in clients 402 in FIG. 4.

In this example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, may be, for example and without limitation, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these examples, the instructions are in a functional form on persistent storage 508. These instructions may be loaded into memory 506 for execution by processor unit 504. The processes of the different advantageous embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different advantageous embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526. Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500. In these examples, computer readable storage media 524 is a non-transitory computer readable storage medium.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the examples.

In some advantageous embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different advantageous embodiments may be implemented. The different advantageous embodiments may be implemented in a data processing system including components in addition to or in place of those illustrated for data processing system 500. Other components shown in FIG. 5 can be varied from the examples shown. The different advantageous embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted because the processes for the different advantageous embodiments are implemented in a hardware unit.

In still another example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 502.

Some, part, or all of the components shown in FIG. 5 may be considered computer processing means or data processing means. FIG. 5 is intended as an example, and not as an architectural limitation for the different advantageous embodiments.

Figure 6:
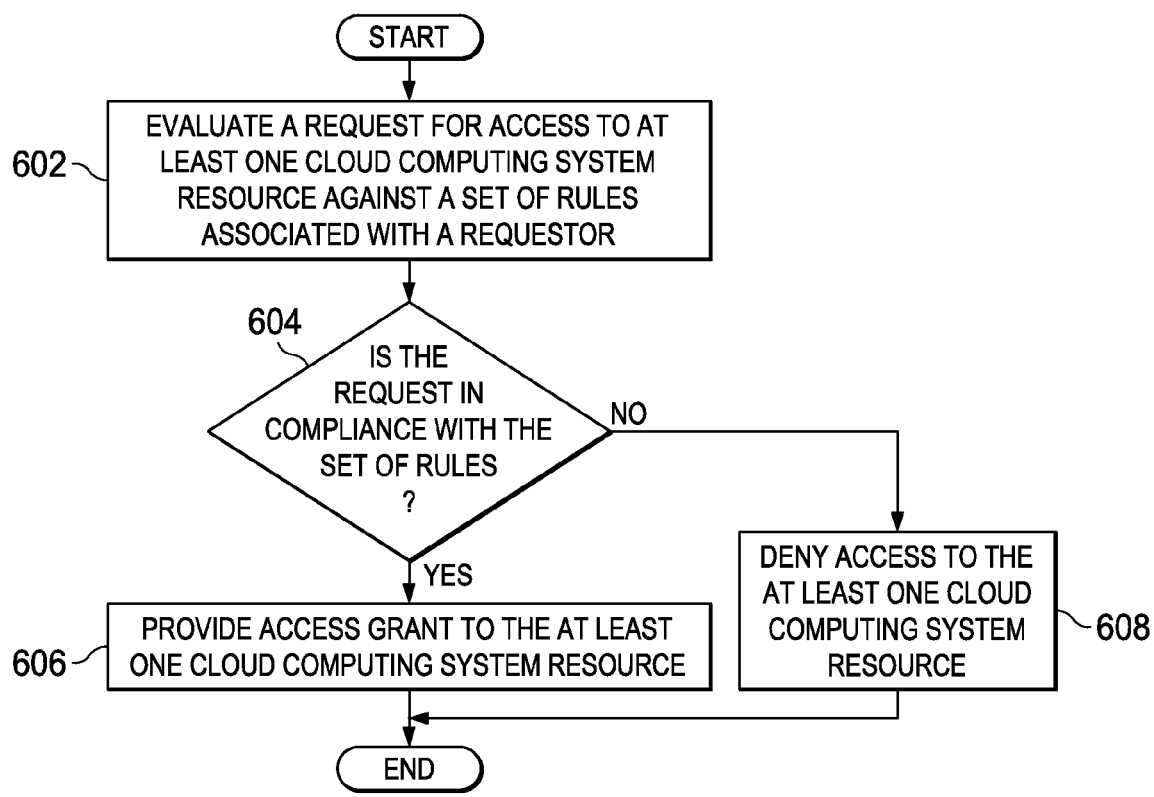
FIG. 6 is a flowchart illustrating a process for cloud computing system security logic module in accordance with an advantageous embodiment.

FIG. 6 is an illustration of a flowchart of a process for cloud computing system security in accordance with an advantageous embodiment. The process in FIG. 6 may be implemented in a rules based security component, such as security logic module 112 in FIG. 1, security logic module 312 in FIG. 3, or security logic module 400 in FIG. 4.

The process begins by evaluating a request for access to at least one cloud computing system resource against a set of rules associated with a requestor (operation 602). The process makes a determination as to whether the request is in compliance with the set of rules (operation 604).

If the request is in compliance with the set of rules, an access grant is provided to the at least one cloud computing system resource (operation 606). The process terminates thereafter. Returning now to step 604, if the request is non-compliant with the set of rules, access to the at least one cloud computing system resource is denied (operation 608) with the process terminating thereafter.

Figure 7:
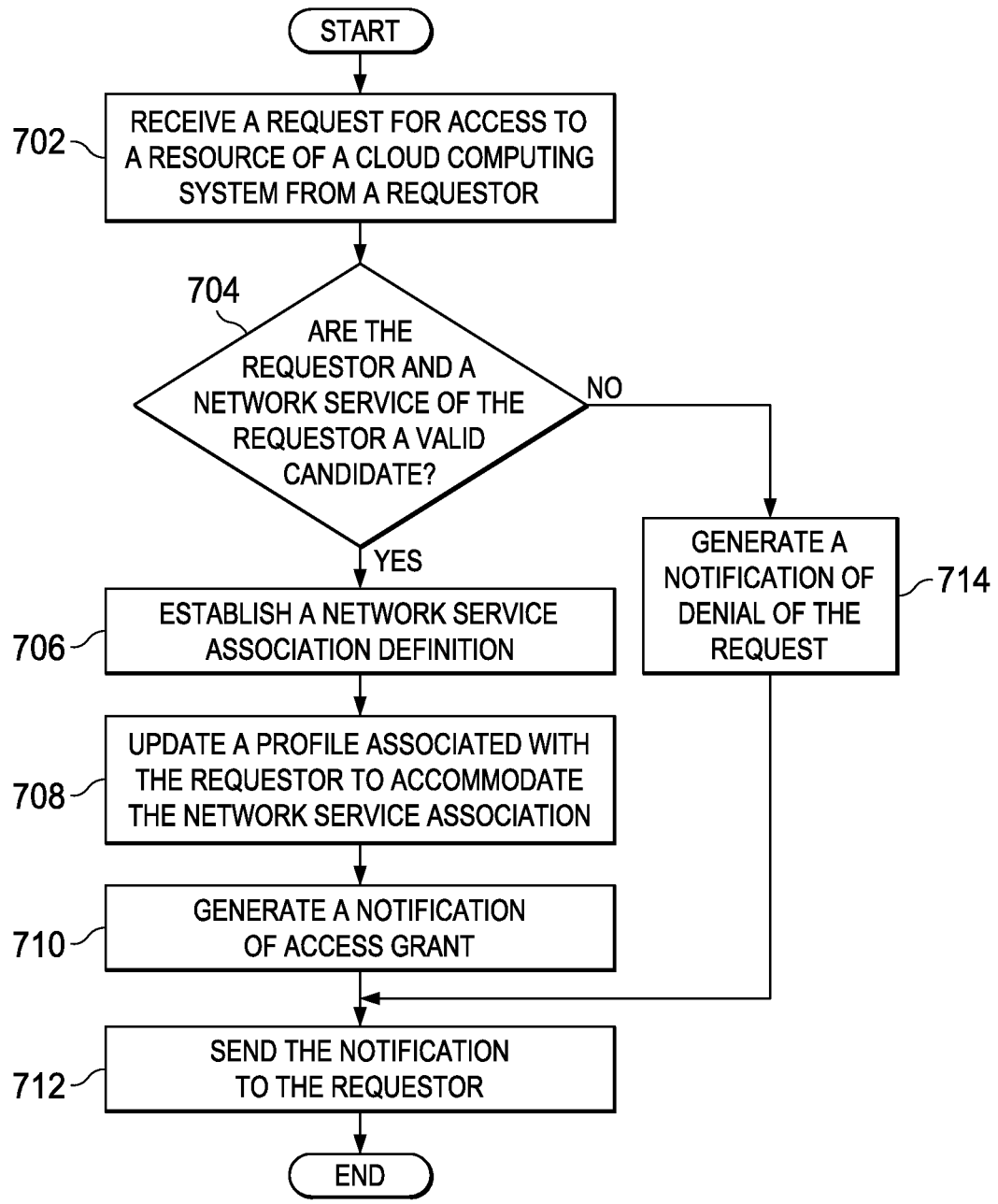
FIG. 7 is an illustration of a flowchart of a process for cloud computing services security in accordance with an advantageous embodiment.

FIG. 7 is an illustration of a flowchart of a process for cloud computing services security in accordance with an advantageous embodiment. The process in FIG. 7 may be implemented in a rules based security component, such as security logic module 112 in FIG. 1, security logic module 312 in FIG. 3, or security logic module 400 in FIG. 4.

The process begins by receiving a request for access to a resource of a cloud computing system from a requestor (operation 702). A determination is made as to whether the requestor and a network service of the requestor is a valid candidate (operation 704). If the requestor and the network service are valid candidates, a network service association definition is established (operation 706).

A profile associated with the requestor is updated to accommodate the network service association definition (operation 708). A notification of access grant is generated (operation 710). The notification is sent to the requestor (operation 712) with the process terminating thereafter.

Returning now to operation 704, if the requestor or the network service is not a valid candidate, a notification of denial of the request is generated (operation 714). The notification is sent to the requestor (operation 712) with the process terminating thereafter.

The different advantageous embodiments can take the form of an entirely hardware embodiment, an entirely software embodiment, or an advantageous embodiment containing both hardware and software elements. Some advantageous embodiments are implemented in software, which includes but is not limited to forms, such as, for example, firmware, resident software, and microcode.

In one advantageous embodiment, a method and system for cloud computing system security is provided. An access manager includes a plurality of client profiles. Each profile in the plurality of client profiles includes a set of rules enabling access to a set of cloud computing system resources. A security logic module communicates with the access manager to receive a request for access to at least one cloud computing system resource. Access is granted and denied upon determining access request compliance with the set of rules.

In another advantageous embodiment, an access manager evaluates an access request to at least one cloud computing system resource against a set of rules associated with a requestor to determine compliance. The access manager grants access to the at least one cloud computing system resource to the requestor in response to the determined compliance.

Access to the resource is granted in response to a determination that the request is in compliance with the set of rules. Access to the resource is denied in response to a determination that the request is non-compliant with the set of rules.

The security logic module of the advantageous embodiments provide a network pattern to enable various users to share data, services, and cost information based on rights of the users on a need to know basis. The security logic module permits users to collaborate throughout a project lifecycle, to share physical devices, logical devices, data and other resources, and obtain more secure access to cloud computing services.

The flowcharts and block diagrams in the different depicted advantageous embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Furthermore, the different advantageous embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), DVD and Blu-Ray.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems, wi-fi devices, such as Bluetooth, and network adapters which are just a few of the currently available types of communications adapters.

As used herein, the phrase "at least one of", when used with a list of items, means that different combinations of one or more of the listed items may be used and only one of each item in the list may be needed. For example, "at least one of item A, item B, and item C" may include, for example, without limitation, item A only, both item A and item B, or all of item A, item B, and item C. This example also may include item A, item B, and item C or item B and item C.

The description of the different advantageous embodiments has been presented for purposes of illustration and description, and is not intended to be exhaustive or limited to the advantageous embodiments in the form disclosed. Many modifications and variations will be apparent to those of ordinary skill in the art. Further, different advantageous embodiments may provide different advantages as compared to other advantageous embodiments. The advantageous embodiment or advantageous embodiments selected are chosen and described in order to best explain the principles of the advantageous embodiments, the practical application, and to enable others of ordinary skill in the art to understand the disclosure for various advantageous embodiments with various modifications as are suited to the particular use contemplated.

What is claimed is:

1. A cloud computing security system, comprising a process run on at least one processor unit, and further comprising:
    an access manager module, comprising an access manager process run on an access manager processor unit, including a first client profile and a second client profile, wherein the first client profile has a first set of rules enabling access to a first set of cloud computing system resources, and wherein the second client profile has a second set of rules enabling access to a second set of cloud computing system resources, such that the first cloud computing resources and the second cloud computing resources are at least one of: identical to each other, and different from each other; and at least one cloud computing system resource being selected from a group consisting of: a platform as a service, a data as a service, a software as a service, an infrastructure as a service, and a network as a service; and
    a security logic module configured to communicate with the access manager module and comprising a request validator module; the request validator module configured to determine that a device and a network service associated with the device are each a valid candidate for access to one of the first and second sets of cloud computing system resources; the security logic module further configured to receive an access request for access to one of the first and second sets of cloud computing system resources and provide an access grant that grants the device collaborative access to at least one of the first and second sets of cloud computing system resources.

2. The cloud computing security system of claim 1, wherein the security logic module further comprises:
    an association definition module configured to establish a model network resource association compliant with the access grant.

3. The cloud computing security system of claim 2, wherein the association definition module is further configured to modify the first client profile to accommodate the model network resource association.

4. The cloud computing security system of claim 1, wherein the security logic module further comprises:
    the request validator module configured to compare the access request with the first and second sets of rules to determine compliance.

5. The cloud computing security system of claim 4, wherein the request validator module is further configured to interrogate the access request and determine whether a requestor associated with the access request is the valid candidate for utilization of the security logic module.

6. The cloud computing security system of claim 1, wherein the security logic module further comprises:
    a notification preparation module configured to generate a notification that contains the access grant.

7. The cloud computing security system of claim 1, wherein the access grant provides granular access to the at least one of the first and second cloud computing system resources.

8. The cloud computing security system of claim 1, wherein the at least one of the first and second cloud computing system resources is a network as a service.

9. The cloud computing security system of claim 8, wherein the security logic module enables granular access to the at least one of the first and second sets of cloud computing system resources accessed through the network as a service.

10. A method for implementing cloud computing system security, the method comprising:
    determining compliance of an access request to at least one cloud computing system resource to a set of rules, based upon evaluating the access request against the set of rules, the set of rules being associated with a requestor, such that evaluating comprises: using a security logic module process on a security logic processor communicating with an access manager module process on an access manager processor, and using a request validator module for determining that a device, and a network service associated with the device, are each a valid candidate for the access request; and
    granting the device collaborative access to the at least one cloud computing system resource to the requestor in response to a determination of compliance, the at least one cloud computing system resource being selected from a group consisting of: a platform as a service, a data as a service, a software as a service, an infrastructure as a service, and a network as a service.

11. The method of claim 10 further comprising:
    maintaining a profile associated with the requestor, wherein the profile has the set of rules, and wherein the set of rules defines granular access to the at least one cloud computing system resource.

12. The method of claim 10 further comprising:
    responsive to evaluating the access request and the determination of compliance, establishing a model network resource association to form a network services association definition.

13. The method of claim 10 further comprising:
    responsive to evaluating the access request, modifying a profile, associated with the requestor, within a plurality of client profiles to include a network service association definition.

14. The method of claim 10 further comprising:
interrogating the access request to determine whether the requestor is the valid candidate for utilization of the security logic module.

15. The method of claim 10 further comprising:
generating a notification to a client device associated with the requestor indicating an access grant.

16. The method of claim 10, wherein the at least one cloud computing system resource is the network as a service and wherein the security logic module enables granular access to shared data in a collaborative environment accessed through the network as a service.

17. A cloud computing apparatus, comprising:
a security logic module, comprising a security logic process run on a security logic processor unit;
an access manager module, comprising an access manager process run on an access manager processor unit, in communication with the security logic module, such that the access manager module is configured to receive an access request from a device for access to at least one cloud computing system resource, the at least one cloud computing system resource being selected from a group consisting of: a platform as a service, a data as a service, a software as a service, an infrastructure as a service, and a network as a service;
a request validator module, comprising a request validator process in the security logic processor unit, operatively coupled to the access manager module and configured to determine whether the device, a requestor associated with the device, and a network service associated with the device, are each a valid candidate for utilization of the security logic module;
the access manager module including a plurality of client profiles, each profile in the plurality of client profiles having a set of rules defining granular access to the at least one cloud computing system resource by the device, such that an access grant is provided upon determination of request compliance with the set of rules; and
an association definition module, comprising an association definition process run on a security module processor unit configured to establish a model network resource association compliant with the access grant.

18. A cloud computing security system of claim 1, wherein determining that the access request complies with at least one of the first set of rules and the second set of rules comprises using a profile compliance module in the security logic module, comprising a profile compliance process run on a security logic processor unit.

* * * * *